(12) United States Patent
Rockwell et al.

(10) Patent No.: US 8,051,958 B1
(45) Date of Patent: Nov. 8, 2011

(54) GUIDE PIN FOR DISC BRAKE ASSEMBLY AND DISC BRAKE ASSEMBLY INCLUDING SUCH A GUIDE PIN

(75) Inventors: Todd Rockwell, South Lyon, MI (US); Eduardo Morais, South Lyon, MI (US); Mauro Marconcin, South Lyon, MI (US)

(73) Assignee: Kelsey-Hayes Company, Livonia, MI (US)

( * ) Notice: Subject to any disclaimer, the term of this patent is extended or adjusted under 35 U.S.C. 154(b) by 851 days.

(21) Appl. No.: 12/070,392

(22) Filed: Feb. 15, 2008

Related U.S. Application Data

(60) Provisional application No. 60/901,756, filed on Feb. 16, 2007.

(51) Int. Cl.
*F16D 65/14* (2006.01)
(52) U.S. Cl. .................................................. 188/73.45
(58) Field of Classification Search ............... 188/73.43, 188/73.44, 73.45; 411/386, 402, 403
See application file for complete search history.

(56) References Cited

U.S. PATENT DOCUMENTS

| | | | | | |
|---|---|---|---|---|---|
| 2,764,886 | A | * | 10/1956 | Wiesmann | 411/403 |
| 2,940,495 | A | * | 6/1960 | Wing | D8/387 |
| 4,162,721 | A | * | 7/1979 | Moriya | 188/73.45 |
| RE30,255 | E | | 4/1980 | Rath et al. | |
| 4,313,526 | A | * | 2/1982 | Farr | 188/73.45 |
| 4,471,858 | A | * | 9/1984 | Kawase | 188/73.44 |
| 5,323,882 | A | | 6/1994 | Waterman et al. | |
| 6,062,786 | A | * | 5/2000 | Garver et al. | 411/386 |
| 6,328,515 | B1 | * | 12/2001 | Donovan | 411/386 |
| 6,361,258 | B1 | * | 3/2002 | Heesch | 411/407 |

FOREIGN PATENT DOCUMENTS

JP 54137573 A * 10/1979
* cited by examiner

*Primary Examiner* — Thomas J Williams
(74) *Attorney, Agent, or Firm* — MacMillan, Sobanski & Todd, LLC

(57) ABSTRACT

An improved guide pin structure adapted for use in a vehicle disc brake assembly comprises a first end including a head portion; a second end including an end face and a lead-in zone, the lead-in zone provided with a rounded generally bullet nose shaped radius adapted for insertion into an aperture of a component of the vehicle disc brake assembly; and a center section defining a shank having a slide surface, the center section defining a guide pin axis; wherein the bullet nose shaped radius of the lead-in zone includes an axial offset relative to the end face and a radial offset relative to the slide surface, and wherein the axial offset is larger than the radial offset by a ratio of at least 2 to 1.

16 Claims, 6 Drawing Sheets

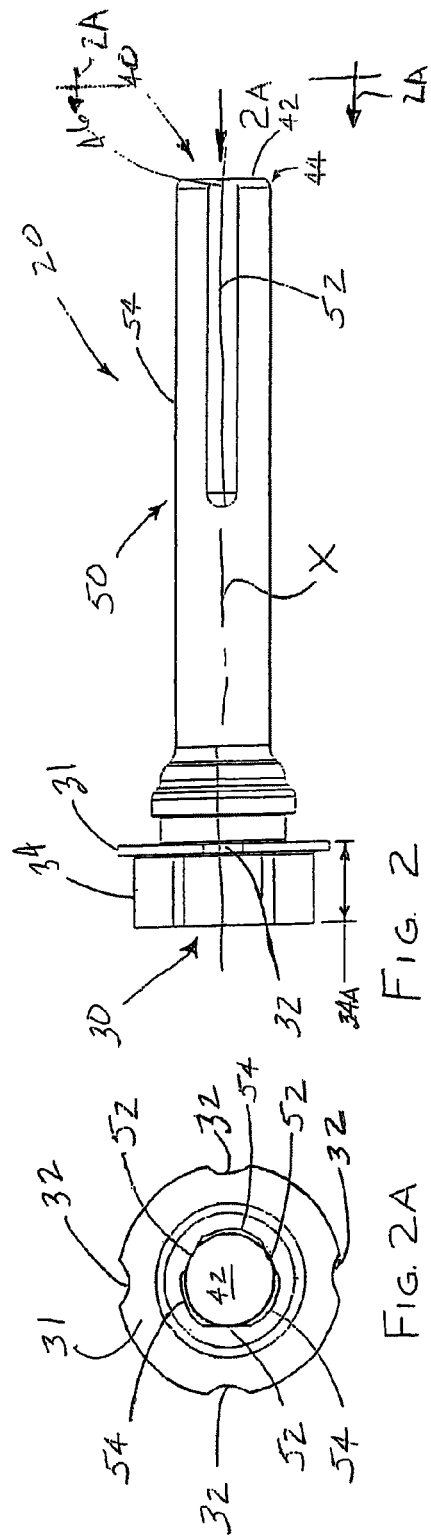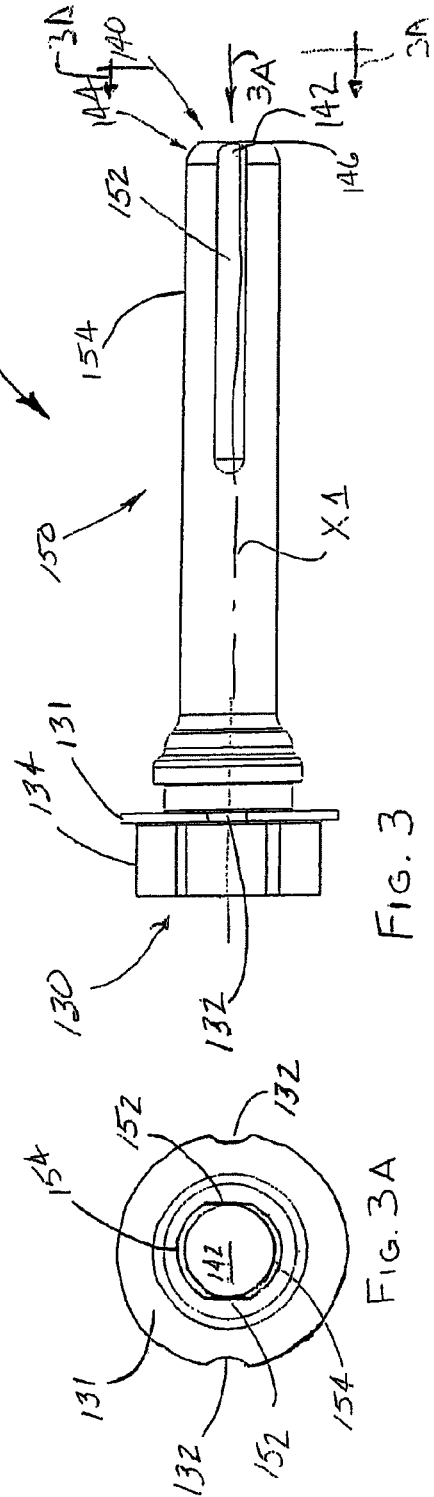

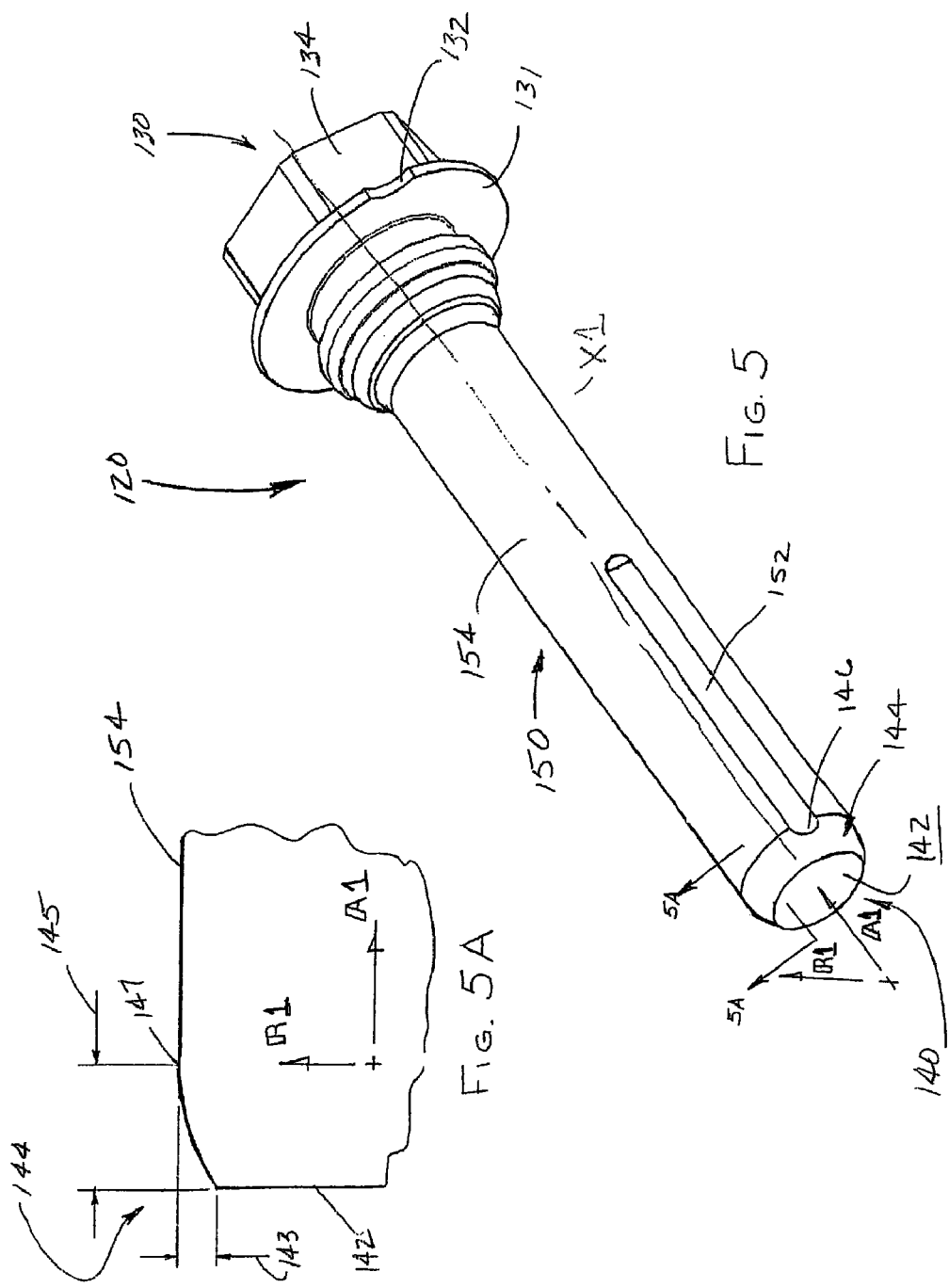

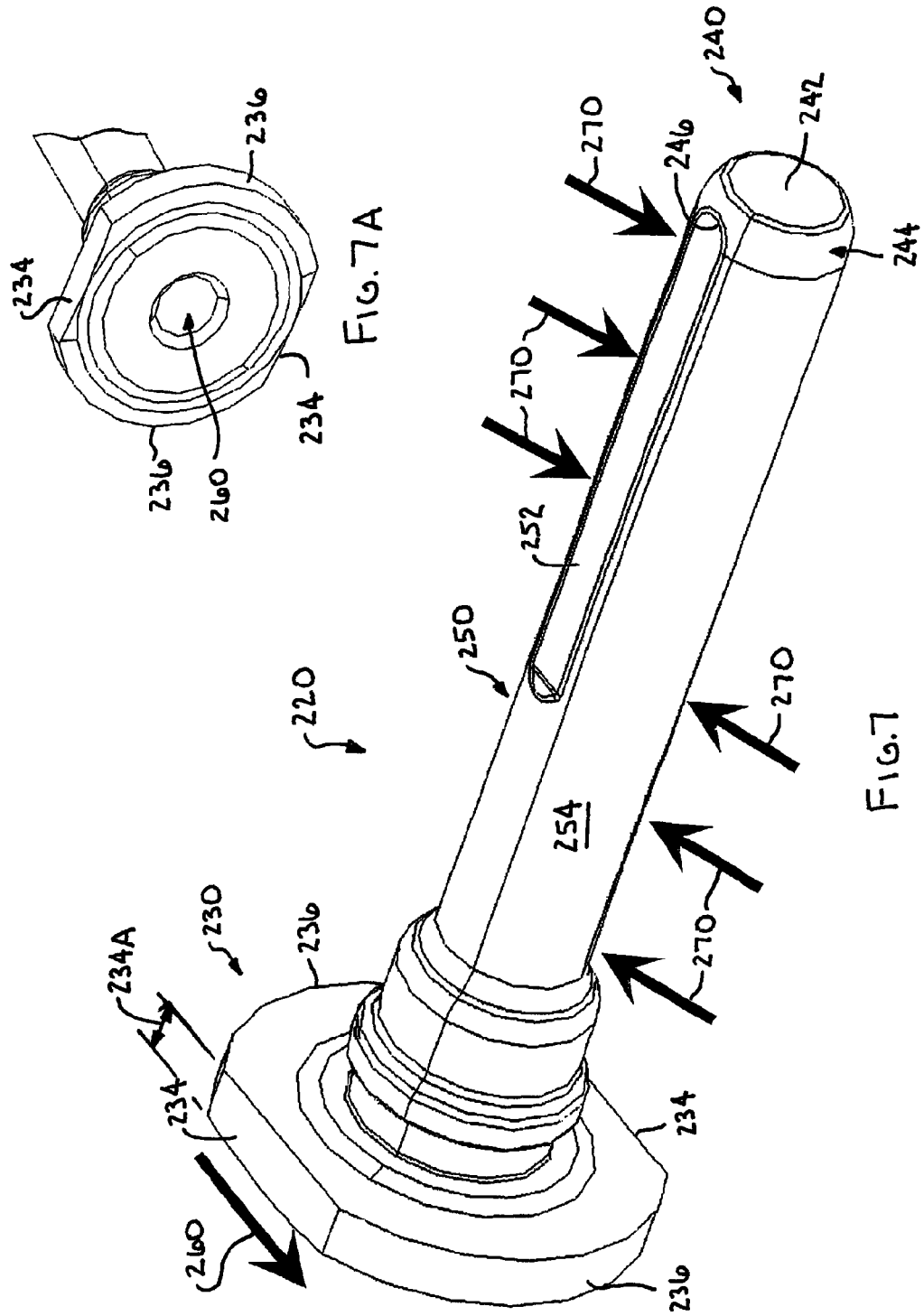

GUIDE PIN FOR DISC BRAKE ASSEMBLY AND DISC BRAKE ASSEMBLY INCLUDING SUCH A GUIDE PIN

CROSS-REFERENCE TO RELATED APPLICATIONS

This application claims the benefit of U.S. Provisional Application Ser. No. 60/901,756, filed Feb. 16, 2007.

BACKGROUND OF THE INVENTION

This invention relates in general to vehicle disc brake assemblies and in particular to an improved structure for a guide pin adapted for use in such a vehicle disc brake assembly and a disc brake assembly including such a guide pin structure.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a rotor which is secured to the wheel of the vehicle for rotation therewith. The rotor includes a pair of opposed friction plates which are selectively engaged by portions of a caliper assembly. The caliper assembly is slidably supported by guide pins secured to an anchor plate or caliper bracket. The anchor plate is secured to a non-rotatable component of the vehicle, such as the steering knuckle or axle flange. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

SUMMARY OF THE INVENTION

This invention relates to an improved guide pin structure adapted for use in a vehicle disc brake assembly and a vehicle disc brake assembly including such a guide pin structure.

According to one embodiment, a guide pin comprises a first end including a head portion; a second end including an end face and a lead-in zone, the lead-in zone provided with a rounded generally bullet nose shaped radius adapted for insertion into an aperture of a component of the vehicle disc brake assembly; and a center section defining a shank having a slide surface, the center section defining a guide pin axis; wherein the bullet nose shaped radius of the lead-in zone includes an axial offset relative to the end face and a radial offset relative to the slide surface, and wherein the axial offset is larger than the radial offset by a ratio of at least 2 to 1.

According to another embodiment, a guide pin comprises a first end including a head portion; a second end including an end face and a lead-in zone, the lead-in zone provided with a rounded generally bullet nose shaped radius adapted for insertion into an aperture of a component of the vehicle disc brake assembly; and a center section defining a shank having a slide surface, wherein the shank portion is provided with at least one slot formed therein along a portion thereof, wherein the first end further includes at least one indicia provided thereon, and wherein the at least indicia is aligned with the at least one slot of the shank portion.

According to yet another embodiment, a guide pin comprises a first end including a head portion; a second end including an end face and a lead-in zone, the lead-in zone provided with a rounded generally bullet nose shaped radius adapted for insertion into an aperture of a component of the vehicle disc brake assembly; and a center section defining a shank having a slide surface, wherein the head portion defines a head axial length and the shank portion defines a shank diameter, and wherein the head axial length is not greater than approximately one half of the shank diameter.

According to a further embodiment, a vehicle disc brake assembly comprises: a brake caliper; a pair of brake pads carried by the disc brake assembly and adapted to be disposed on opposite axial sides of the brake rotor; an actuator for selectively moving the brake pads into frictional engagement with a brake rotor; and a pair of guide pins adapted to be secured to a fixed component for slidably supporting the brake caliper, at least one of the guide pins including a first end including a head portion, a second end including an end face and a lead-in zone, the lead-in zone provided with a rounded generally bullet nose shaped radius adapted for insertion into an aperture of a component of the vehicle disc brake assembly, and a center section defining a shank having a slide surface, the center section defining a guide pin axis, wherein the bullet nose shaped radius of the lead-in zone includes an axial offset relative to the end face and a radial offset relative to the slide surface, and wherein the axial offset is larger than the radial offset by a ratio of at least 2 to 1.

According to a yet a further embodiment, a vehicle disc brake assembly comprises: a brake caliper; a pair of brake pads carried by the disc brake assembly and adapted to be disposed on opposite axial sides of the brake rotor; an actuator for selectively moving the brake pads into frictional engagement with a brake rotor; and a pair of guide pins adapted to be secured to a fixed component for slidably supporting the brake caliper, each of the guide pins including a first end including a head portion, a second end including an end face and a lead-in zone, the lead-in zone provided with a rounded generally bullet nose shaped radius adapted for insertion into an aperture of a component of the vehicle disc brake assembly, and a center section defining a shank having a slide surface, the center section defining a guide pin axis, wherein the bullet nose shaped radius of the lead-in zone includes an axial offset relative to the end face and a radial offset relative to the slide surface, wherein the axial offset is larger than the radial offset by a ratio of at least 2 to 1, wherein the shank portion is provided with only two slots formed therein along a portion thereof, wherein the first end includes a pair of indicia provided thereon, and wherein a respective one of the pair of indicia is aligned with a respective one of the two slots of the shank portion.

Other advantages of this invention will become apparent to those skilled in the art from the following detailed description of the preferred embodiments, when read in light of the accompanying drawings.

BRIEF DESCRIPTION OF THE DRAWINGS

FIG. 2 is a side view of the prior art guide pin.

FIG. 2A is an end view of the prior art guide pin taken along axis 2A of FIG. 2.

FIG. 3 is a side view of a first embodiment of a guide pin in accordance with the present invention.

FIG. 3A is an end view of the guide pin taken along axis 3A of FIG. 3.

FIG. 5 is a perspective view of the guide pin of FIG. 3 in accordance with a first embodiment of the present invention.

FIG. 5A is an enlarged view taken along line 5A-5A of FIG. 5.

FIG. 7 is a perspective view of a second embodiment of a guide pin in accordance with the present invention.

FIG. 7A is a perspective view of a portion of the guide pin of FIG. 7.

DETAILED DESCRIPTION OF THE PREFERRED EMBODIMENTS

Figure 1:
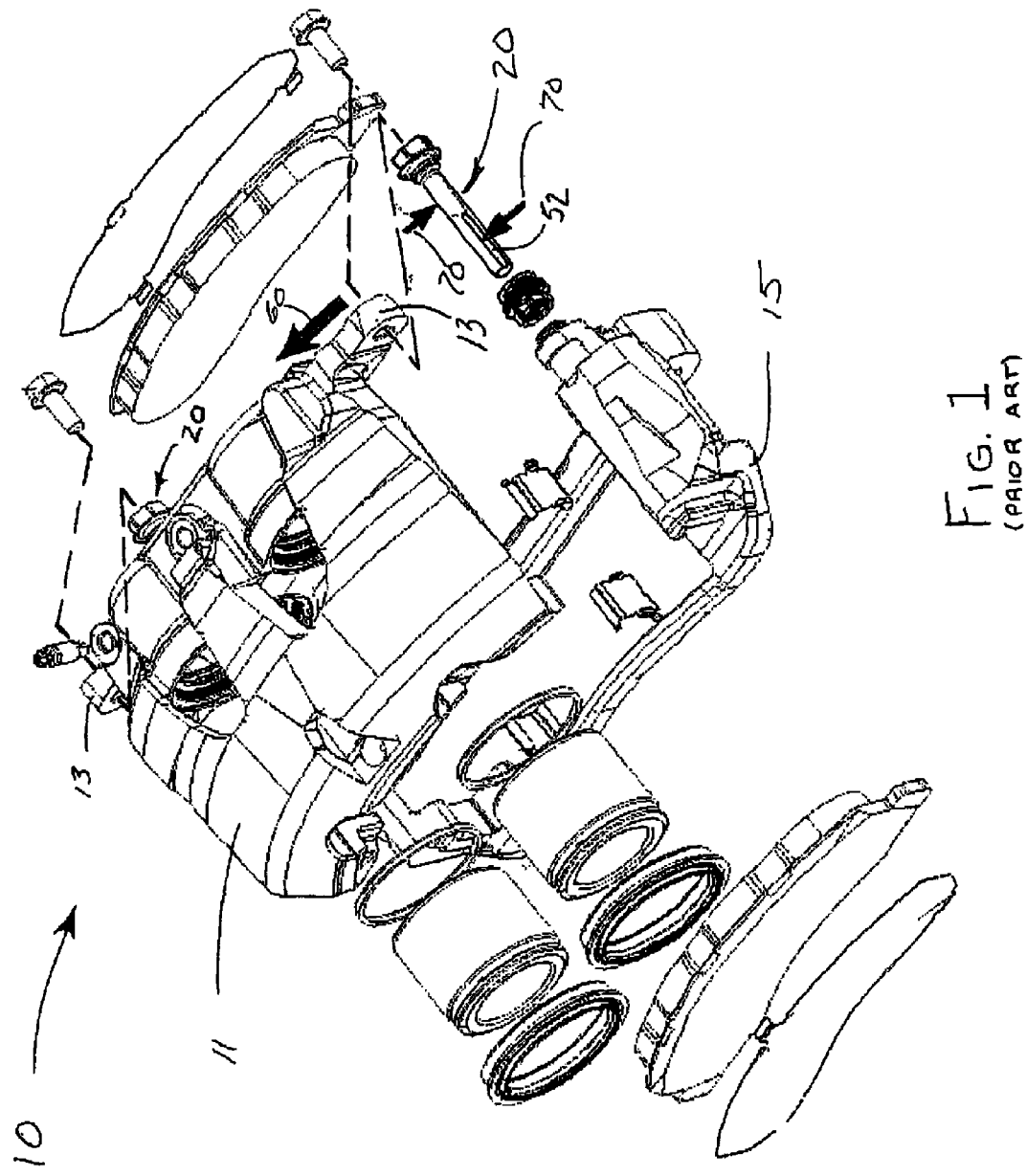
FIG. 1 is an exploded, perspective view of a brake caliper including a prior art guide pin.

Referring now to the drawings, there is illustrated in FIG. 1 a portion of a prior art vehicle disc brake assembly, indicated generally at 10, including a pair of guide pins, indicated generally at 20. The prior art disc brake assembly 10 in FIG. 1 depicts a "Colette" type of disc brake assembly, such as that shown in U.S. Pat. No. 5,323,882 to Waterman et al. and U.S. Pat. No. Re 30,255 to Rath et al., the disclosures of both of these patents incorporated herein by reference in entirety. The prior art disc brake assembly 10 is conventional and well known in the art. The disc brake assembly 10 is provided for discussion purposes to illustrate the prior art guide pin 20 and the operating environment therein. Thus, only those portions of the prior art vehicle disc brake assembly 10 which are necessary for a full understanding of this invention will be explained and illustrated. Although the invention will be described and illustrated in connection with the particular prior art vehicle disc brake assembly 10 disclosed herein, it will be appreciated that the invention may be used in connection with other vehicle disc brake assembly structures if so desired.

The illustrated prior art disc brake assembly 10 includes a brake caliper 11, having at least an ear 13, and preferably a pair of ears 13. The brake caliper 11 via the guide pins 20 is supported for sliding movement relative to a fixed caliper bracket or anchor plate 15 by any appropriate method, such as threading, bolting, press fitting, snap fitting, and the like if so desired.

Figures 4, 4A:
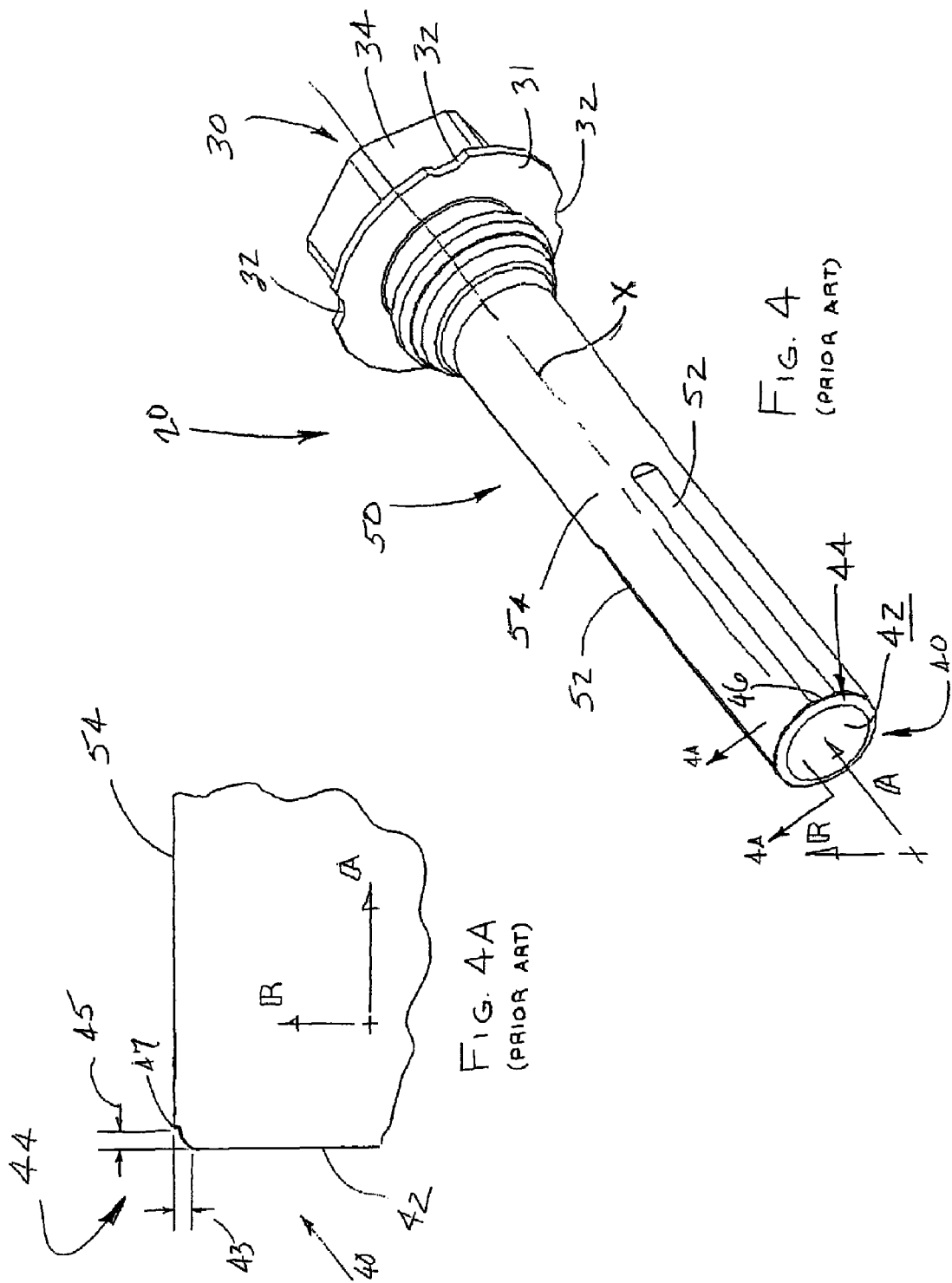
FIG. 4 is a perspective view of the prior art guide pin of FIG. 2.
FIG. 4A is an enlarged view taken along line 4A-4A of prior art FIG. 4.

The prior art guide pin 20 includes a first end, indicated generally at 30, defining a head portion, as best illustrated in FIGS. 2 and 4. The guide pin 20 further includes a second end, indicated generally at 40, defining a lead-in portion, and a center section, indicated generally at 50, defining a shank portion. The first end 30 includes a hexagonal head 34 that is operative to rotate the guide pin 20 for fastening to, for example, the brake caliper 11 or another intended mounting point if so desired. The first end 30 further includes a flange 31 having a plurality of reliefs 32 disposed around the circumference of the flange 31. However, the plurality of reliefs 32 disposed about the circumference of flange 31 are not provided in an amount or an arrangement to indicate the relative orientations of the grease slots 52.

The head 34 of the prior art guide pin 20 is provided with an axial head length 34A, as shown in FIG. 2, which extends between the ear 13 and the caliper mounting bracket 15. The head length 34A creates a standout condition between the caliper 11 and the caliper mounting bracket 15. The relative length of the head 34 is typically approximately 70% of the shank diameter. For example, a guide pin 20 with a shank diameter of 10 millimeters may have a head length of approximately 7 millimeters. The amount of standout created by the head length 34A can have a negative impact on packaging requirements due to the increased spatial accommodations necessary for installation.

Prior art FIGS. 2 and 4 illustrate the guide pin 20, further including the second end 40 that defines a lead-in portion. The second end 40 of the prior art guide pin 20 includes an end face 42, a lead-in zone, indicated generally at 44, and a grease slot run-out zone 46. The intersection of the end face 42 and the slide surface 54, of the shank portion 50 defines the area of the lead-in zone 44. Prior art FIG. 4 further includes an axis orientation wherein "A" defines an axial direction along an axial centerline or axis X of guide pin 20 and "R" defines a radial direction, perpendicular to the axis "A".

The lead-in zone 44 of the prior art guide pin 20, best illustrated in prior art FIGS. 4 and 4A, is typically formed as a rounded radius or as a flat chamfer. Prior art FIG. 4A shows the lead-in zone 44 as an edge having an axial offset 45 relative to the end face 42. Prior art FIG. 4A further shows the lead-in zone 44 having a radial offset 43 relative to the slide surface 54. The offsets 43 and 45 are generally equal in dimension and small in magnitude relative to a diameter of the center section 50. The offsets 43 and 45 may define a radius centerline at a projected intersection within the cross section of the second end 40 shown in FIG. 4A. Alternatively, the offsets 43 and 45 may define points on the adjacent surfaces 42 and 54 respectively wherein a chamfer (not shown) may transition to the adjacent surfaces.

The shape and size of the offsets 43 and 45 are typically created during the guide pin forming operation process. This process may result in a sharp edge or bump 47 formed on the lead-in zone 44, generally in the area of the offset 45, as shown in prior art FIG. 4A. The lead-in zone 44 of the prior art guide pin 20 engages the caliper mounting bracket 15 in a sliding relationship. Thus, the sharp edge or bump 47 may undesirably inhibit the sliding movement of the guide pin 20 relative to the caliper mounting bracket 15 during operation.

The guide pin 20 further includes a center section, indicated generally at 50 in prior art FIG. 2, defining a shank portion having a slide surface 54 and three grease slots 52. FIG. 2A illustrates the three grease slots 52 of prior art guide pin 20 disposed around the circumference of shank 50 in a generally equal spacing arrangement, each approximately 120 degrees apart. The grease slots 52 provide a channel to facilitate the flow of lubricant to the slide surface 54 and also prevent a vacuum/pressure lock of air between the mating sliding surfaces of the components. The grease slots 52 however are not in direct contact with any mating slide surfaces of the caliper bracket 15. Consequently, the contact area of the slide surface 54 is reduced when a grease slot 52 is oriented in the direction of a pair of reactive loads, indicated by arrows 70, from an applied load, indicated by arrow 60, as illustrated in prior art FIG. 1.

Referring now to FIG. 3, there is illustrated a first embodiment of a guide pin, indicated generally at 120. In the illustrated embodiment, the guide pin 120 includes a first end, indicated generally at 130 which defines a head portion. The guide pin 120 further includes a second end, indicated generally at 140, which defines a lead-in portion, and a center section, indicated generally at 150, which defines a shank portion.

Figure 6:
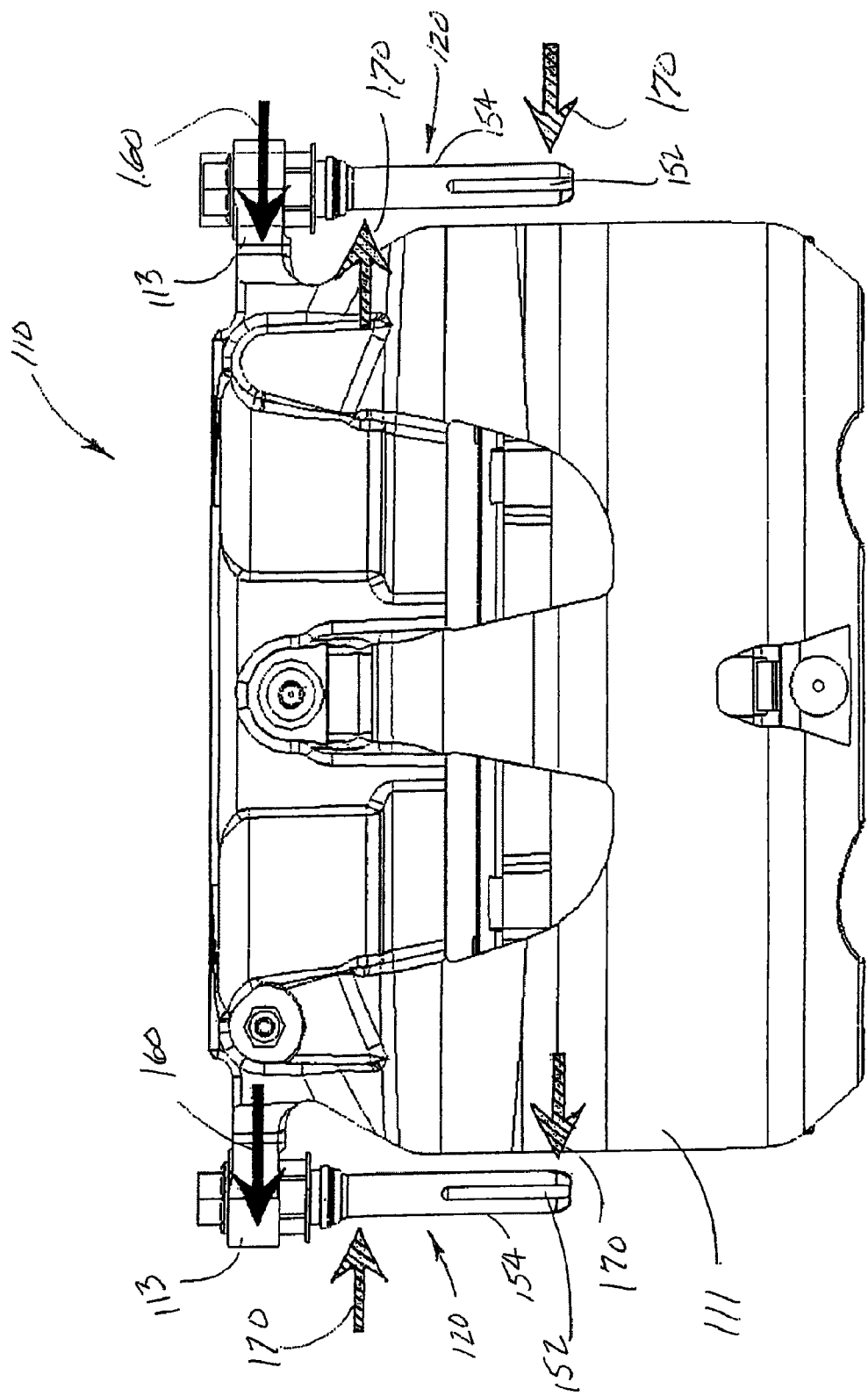
FIG. 6 is a plan view of a brake caliper having the guide pins of FIG. 5 and showing braking load orientations.

In the illustrated embodiment, the first end 130 includes a hexagonal shaped head 134 for fastening to, for example, a brake caliper 111, as illustrated in FIG. 6, or another intended mounting point if so desired. The hexagonal head 134 however may be other than as illustrated if so desired. Alternative structures may also include, but are not limited to, any configurations having a nut-like shaped end and the like.

In the illustrated embodiment, the first end 130 further includes a flange 131 having a plurality of reliefs or other suitable indicia or indicators 132 provided thereon. The plurality of reliefs 132 are disposed about the circumference of flange 131 and in the illustrated embodiment preferably serve as indicia for locating a plurality of grease slots 152 formed on the shank 150. The reliefs 132 are provided in an amount and an arrangement to indicate the relative orientations of the grease slots 152 formed on the shank 150, as shown in FIG. 3A. In a preferred embodiment, the grease slots 152 are provided as a pair of grease slots 152 oriented relatively at 180 degrees apart from each other. The grease slots 152 may preferably be oriented such that a pair of reactive loads 170, shown in FIG. 6, are applied against the slide surface 154 of the associated guide pin 120.

FIGS. 3 and 5 illustrate the guide pin 120, further including the second end 140 which defines a lead-in portion. The second end 140 of the guide pin 120 includes an end face 142, a lead-in zone, indicated generally at 144, and a grease slot run-out zone 146. The intersection of the end face 142 and the slide surface 154, of the shank portion 150 defines the area of the lead-in zone 144. FIG. 5 further includes an axis orientation wherein "A1" defines an axial direction along an axial centerline or axis X1 of guide pin 120 and "R1" defines a radial direction, perpendicular to the axis "A1".

In the illustrated embodiment, the lead-in zone 144 of the guide pin 120, best illustrated in FIGS. 5 and 5A, may be formed as a portion of a rounded radius resembling a "bullet nose" shaped tip or surface. FIG. 5A shows the lead-in zone 144 as having an axial offset 145 relative to the end face 142. FIG. 5A further shows the lead-in zone 144 having a radial offset 143 relative to the slide surface 154. In the illustrated embodiment, the offset 145 is larger than the offset 143. The ratio of the offset 145 to the offset 143 may be approximately 2 to 1; however other ratios may be used if so desired. In a preferred embodiment, the ratio of the offset 145 to the offset 143 is approximately 3 to 1. The offsets 143 and 145 may further define a radius centerline at a projected intersection within the cross section of the second end 140 as shown in FIG. 5A, if so desired.

The shape and size of the offsets 143 and 145 are preferably created during the pin forming operation process if so desired. The lead-in zone 144 of the guide pin 120 engages the caliper mounting bracket 15 in a sliding relationship. Due to the increased axial offset 145, during the forming process a burr or bump may not even occur on the lead-in-zone 144 of the guide pin 120; however, as shown in FIG. 4A, if a burr 147 does occur it would be over an increased surface area provided by the increased axial offset 145 so that it produce less of a problem on the lead-in-zone 144 compared to that of the burr 47 in the lead-in-zone 44 of the prior art guide pin 50 as shown in prior art FIG. 4A. Alternatively, the construction of the guide pin 120 may be other than illustrated and described if so desired. For example, the configuration, number and/or orientation of the first end 130, the shank 150, the slots 152 in the shank 150, and/or the reliefs 132 of the first end 130 may be other than illustrated and described if so desired.

Referring now to FIG. 6, there is illustrated the orientation of an applied load, indicated by arrow 160, occurring on at least an ear 113 of the brake caliper 111. The brake caliper 111 is similar to the brake caliper 11 of prior art FIG. 1, but includes the first embodiment of the guide pins 120 as shown in FIGS. 3 and 5. As shown therein, in this embodiment the alignment of the two reliefs 132 with the two grease slots 152 provides the ability to align or position the grease slots 152 away from the plane of the reactive loads, indicated by the arrows 170, in order to provide a larger uninterrupted surface area on the shank 150 to react with the applied load 160.

Referring now to FIGS. 7 and 7A, there is illustrated a second embodiment of a guide pin, indicated generally at 220. In this embodiment, the guide pin 220 includes a shank 254 that is similar to the shank 154 shown in FIG. 5 in that a reactive load, indicated in this embodiment by a plurality of arrows 270, is distributed along the shank 254 in the same manner as it is distributed along shank 154 of guide pin 120.

In the illustrated embodiment of FIGS. 7 and 7A, the guide pin 220 includes a first end, indicated generally at 230, which defines a "compact" head portion. The guide pin 220 further includes a second end, indicated generally at 240, which defines a lead-in portion, and a center section, indicated generally at 250, which defines a shank portion.

In the illustrated embodiment, the compact head 230 may include a threaded aperture 260 if so desired. The threaded aperture 260 may be formed into a surface of the compact head 230 which is opposite of the surface projecting the shank 250.

In the illustrated embodiment, the compact head 230 preferably includes a pair of opposed surfaces 234 which are in alignment with a pair of grease slots 252 provided on the shank 250 of the guide pin 220. The opposed surfaces 234 may also serve as a geometry that is operative to enable rotation of the guide pin 220 for fastening to, for example, the brake caliper 111 illustrated in FIG. 6, or another intended mounting point or member if so desired. The geometry of the surfaces 234 however may be other than as illustrated if so desired. Alternative structures may include any nut-like shape or any other desired shape which enables rotation or installation of the guide pin 220 to a desired member.

In the illustrated embodiment, the compact head 230 also preferably includes a pair of arcuate surfaces 236 disposed between the opposed surfaces 234. The arcuate surfaces 236 may be provided as geometries other than arcuate if so desired. For example, the arcuate surfaces 236 may be formed as a series of shorter straight sections if so desired.

In the illustrated embodiment, the compact head 230 further includes an axial head length 234A which is of a shorter length than the head length 34A of the prior art head portion 30 shown in FIG. 2. Thus, for example, in prior art FIG. 1 the compact head length 234A of the guide pin 220 would be situated between the ear 13 and the caliper mounting bracket 15 of the brake caliper 10. Thus, it can be readily realized that the compact head length 234A of the guide pin 220 creates an improved, shorter "standout condition" between the caliper 11 and the caliper mounting bracket 15 when substituted for the prior art guide pin 20 of the prior art disc brake assembly 10 of FIG. 1.

The relative length of the compact head 234A may be less than approximately 50 percent to approximately 70 percent of the shank diameter, if so desired. In a preferred embodiment, the compact head length 234A may be approximately 40 percent of the shank diameter. For example, a guide pin 220 with a shank diameter of 10 millimeters may have a compact head length of approximately 4 millimeters. The amount of standout created by the compact head length 234A can improve packaging requirements due to the decreased spatial accommodations necessary for installation.

In the illustrated embodiment, the second end 240 or lead-in-portion of the guide pin 220 includes an end face 242, a lead-in zone, indicated generally at 244, and a grease slot run-out zone 246. The intersection of the end face 242 and the slide surface 254 of the shank portion 250 defines the area of the lead-in zone 244. The second end 240 and shank portion 250 of the guide pin 220 may be operatively and dimensionally similar to the second end 140 and shank 150 of the first embodiment of the guide pin 120 discussed hereinbefore. Alternatively, the construction of the guide pin 220 may be other than illustrated and described if so desired. For example, the configuration, number and/or orientation of the second end 240, the shank 20, the slots 252 in the shank 250 and/or the reliefs 234 in the first end 230 may be other than illustrated and described if so desired.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A guide pin adapted for use in a vehicle disc brake assembly comprising:
    a first end including a head portion;
    a second end including an end face and a lead-in zone, the lead-in zone provided with a rounded generally bullet nose shaped radius adapted for insertion into an aperture of a component of the vehicle disc brake assembly; and
    a center section defining a shank having a slide surface, the center section defining a guide pin axis;
    wherein the bullet nose shaped radius of the lead-in zone includes an axial offset relative to the end face and a radial offset relative to the slide surface, and wherein the axial offset is larger than the radial offset by a ratio of at least 2 to 1;
    wherein the shank portion is provided with only two slots formed therein along a portion thereof;
    wherein the two slots are arranged on the shank portion of the guide pin generally one-hundred and eighty degrees apart from each other;
    wherein the slide surface is defined on the shank portion of the guide pin at least in an area defined between the two slots thereof;
    wherein the first end of the guide pin further includes at least one indicia provided thereon; and
    wherein the at least one indicia is arranged in alignment with at least one of the two slots of the shank portion in order to enable the guide pin to be installed in a guide pin bore provided in the vehicle disc brake assembly with the two slots of the shank portion oriented in a predetermined position in the guide pin bore such that a pair of reactive loads which are generated during brake actuation are applied only against the slide surface of the guide pin and are not applied against the two slots of the guide pin.

2. The guide pin of claim 1 wherein a ratio of the axial offset to the radial offset is approximately 3 to 1.

3. The guide pin of claim 1 wherein the first end includes a pair of indicia provided thereon, and wherein a respective one of the pair of indicia is aligned with a respective one of the two slots of the shank portion.

4. The guide pin of claim 1 wherein the head portion defines a head axial length and the shank portion defines a shank diameter, and wherein the head axial length is not greater than approximately one half of the shank diameter.

5. The guide pin of claim 4 wherein said head portion includes a threaded aperture.

6. A vehicle disc brake assembly comprising:
    a brake caliper;
    a pair of brake pads carried by the disc brake assembly and adapted to be disposed on opposite axial sides of a brake rotor;
    an actuator for selectively moving the brake pads into frictional engagement with the brake rotor; and
    a pair of guide pins adapted to be secured to a fixed component for slidably supporting the brake caliper, at least one of the guide pins including a first end including a head portion, a second end including an end face and a lead-in zone, the lead-in zone provided with a rounded generally bullet nose shaped radius adapted for insertion into an aperture of a component of the vehicle disc brake assembly, and a center section defining a shank having a slide surface, the center section defining a guide pin axis, wherein the bullet nose shaped radius of the lead-in zone includes an axial offset relative to the end face and a radial offset relative to the slide surface, and wherein the axial offset is larger than the radial offset by a ratio of at least 2 to 1;
    wherein the shank portion is provided with only two slots formed therein along a portion thereof;
    wherein the two slots are arranged on the shank portion of the guide pin generally one-hundred and eighty degrees apart from each other;
    wherein the slide surface is provided on the shank portion of the guide pin at least in an area defined between the two slots thereof;
    wherein the first end of the guide pin further includes at least one indicia provided thereon; and
    wherein the at least one indicia is arranged in alignment with at least one of the two slots of the shank portion in order to enable the guide pin to be installed in a guide pin bore provided in the vehicle disc brake assembly with the two slots of the shank portion oriented in a predetermined position in the guide pin bore such that a pair of reactive loads which are generated during brake actuation are applied only against the slide surface of the guide pin and are not applied against the two slots of the guide pin.

7. The vehicle disc brake assembly of claim 6 wherein a ratio of the axial offset to the radial offset is approximately 3 to 1.

8. The vehicle disc brake assembly of claim 6 wherein the first end includes a pair of indicia provided thereon, and wherein a respective one of the pair of indicia is aligned with a respective one of the two slots of the shank portion.

9. The vehicle disc brake assembly of claim 6 wherein the head portion defines a head axial length and the shank portion defines a shank diameter, and wherein the head axial length is not greater than approximately one half of the shank diameter.

10. The vehicle disc brake assembly of claim 9 wherein said head portion includes a threaded aperture.

11. A vehicle disc brake assembly comprising:
    a brake caliper;
    a pair of brake pads carried by the disc brake assembly and adapted to be disposed on opposite sides of a brake rotor;
    an actuator for selectively moving the brake pads into frictional engagement with the brake rotor; and
    at least one guide pin adapted to be secured to a vehicle component for slidably supporting the brake caliper, the at least one of the guide pin including a first end including a head portion, a second end including an end face and a lead-in zone, and a center section defining a shank having a slide surface, the center section defining a guide pin axis;

wherein the shank portion is provided with only two slots formed therein along a portion thereof;

wherein the two slots are arranged on the shank portion of the guide pin generally one-hundred and eighty degrees apart from each other;

wherein the slide surface is provided on the shank portion of the guide pin at least in an area defined between the two slots thereof;

wherein the first end of the guide pin further includes at least one indicia provided thereon; and wherein the at least one indicia is arranged in alignment with at least one of the two slots of the shank portion in order to enable the guide pin to be installed in a guide pin bore provided in the vehicle disc brake assembly with the two slots of the shank portion oriented in a predetermined position in the guide pin bore such that a pair of reactive loads which are generated during brake actuation are applied only against the slide surface of the guide pin and are not applied against the two slots of the guide pin.

12. The vehicle disc brake assembly of claim 11 wherein the lead-in zone is provided with a rounded generally bullet nose shaped radius adapted for insertion into an aperture of a component of the vehicle disc brake assembly.

13. The vehicle disc brake assembly of claim 11 wherein the first end includes a pair of indicia provided thereon, and wherein a respective one of the pair of indicia is aligned with a respective one of the two slots of the shank portion.

14. The vehicle disc brake assembly of claim 11 wherein the head portion defines a head axial length and the shank portion defines a shank diameter, and wherein the head axial length is not greater than approximately one half of the shank diameter.

15. The vehicle disc brake assembly of claim 13 wherein said head portion includes a threaded aperture.

16. The vehicle disc brake assembly of claim 12 wherein the rounded shaped radius of the lead-in zone includes an axial offset relative to the end face and a radial offset relative to the slide surface, wherein the axial offset is larger than the radial offset by a ratio of at least 2 to 1.

* * * * *